No. 774,858. PATENTED NOV. 15, 1904.
E. C. TRISLER.
DEVICE FOR DRAWING AND MEASURING ANGLES.
APPLICATION FILED JULY 22, 1904.
NO MODEL.
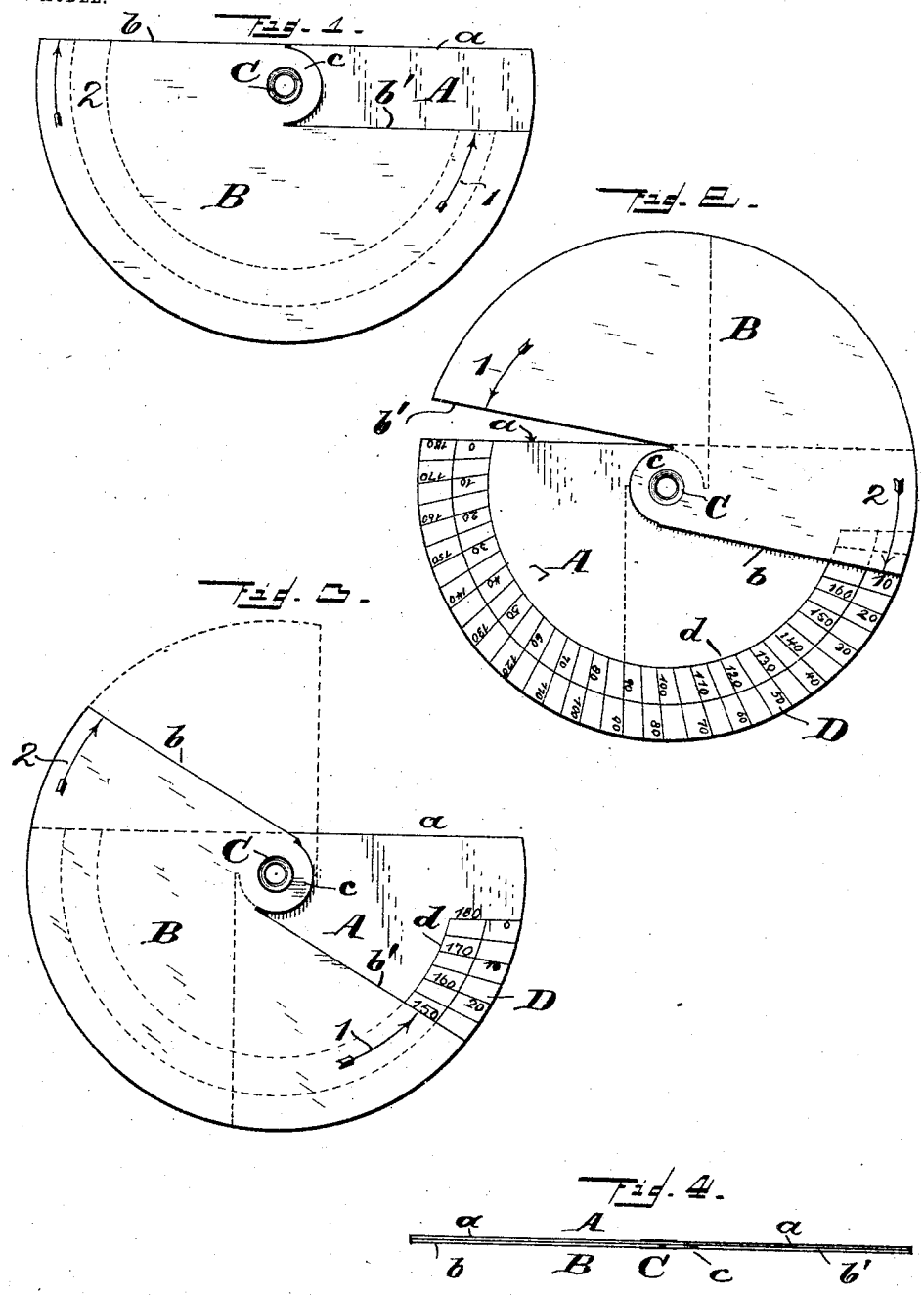
WITNESSES:
Chas. H. Wheelwright
Arthur Kline
INVENTOR
Early C. Trisler
BY
C. Spengel
ATTORNEY.

No. 774,858.

Patented November 15, 1904.

UNITED STATES PATENT OFFICE.

EARLY C. TRISLER, OF HOME CITY, OHIO, ASSIGNOR OF ONE-HALF TO THOMAS LEE, OF HOME CITY, OHIO.

DEVICE FOR DRAWING AND MEASURING ANGLES.

SPECIFICATION forming part of Letters Patent No. 774,858, dated November 15, 1904.

Application filed July 22, 1904. Serial No. 217,643. (No model.)

*To all whom it may concern:*

Be it known that I, EARLY C. TRISLER, a citizen of the United States, residing at Home City, in the county of Hamilton and State of Ohio, have invented a certain new and useful Device for Drawing and Measuring Angles; and I do declare the following to be a clear, full, and exact description thereof, attention being called to the accompanying drawings, with the reference characters marked thereon, which form also a part of this specification.

This invention relates to mathematical devices of the kind used for determining, drawing, and measuring angles, and commonly known as "protractors."

The particular features of this invention reside in the specific construction and arrangement of parts, which while of the utmost simplicity permits the measuring and drawing of angles complete to the vertex to be quickly and conveniently performed.

In the following specification, and particularly pointed out in the claims, is found a full description of the invention, together with its manner of use, parts, and construction, which latter is also illustrated in the accompanying drawings, in which—

Figure 1 shows the implement in its normal or closed-up condition and when not used. Fig. 2 shows it adjusted to form an acute angle. Fig. 3 shows it adjusted to form an obtuse angle. Fig. 4 shows an edge view of it, it being the upper edge of Fig. 1.

This instrument may be manufactured for use by mechanics and artisans like machinists and woodworkers, as well as for school purposes, to be used in the usual manner and also to assist in the teaching and study of mathematics and geometry, serving for demonstration of problems and facts. It is preferably constructed of sheet metal, although pasteboard may also be used where the instrument is manufactured for school purposes.

The leading characteristic of my instrument is great compactness, permitting its bulk to be greatly reduced when not in use, thus taking up less space and protecting also the instrument. With such compactness the instrument combines capacity to form complete any angle from one to one hundred and eighty degrees—that is, the two angle-forming lines or legs may be had and drawn complete to the point where they join each other and form the vertex. This is of especial advantage for school purposes and for teaching drawing and geometry.

The instrument consists of two substantially semicircular disk-shaped members A and B, having a common center, where they are jointed flatwise and pivotally connected to each other, as shown at C. The details of construction of this pivotal connection are immaterial. It may be by a flat-headed pivot or countersunk screw, if sheet metal is used in the manufacture, or it may be an eyelet, as shown, when members A and B consist of pasteboard, as is here assumed. The pivotal connection is located within the semicircular area of each member, so that these latter when fully opened out still partly overlap each other. They do so, however, only on one side from the center, the material of one member being removed on the other side to an extent as best shown in Fig. 1, which shows the instrument in its normal or closed-up state. The object of this removal is to obtain edges which enable me to form angles complete—that is, to draw the lines to the vertex—which would otherwise not be possible in view of the manner whereby the two members are connected. The width of this removed part from the diametrical base-line inwardly is governed by the material required to form the pivotal connection or "hub" $c$, as it might be appropriately termed, and is twice the distance from said base-line to the turning center, or equal to the diameter of this hub, so that this turning center is midway between the two parallel lines $b$ and $b'$. The usefulness of this arrangement will be presently better understood by observing Fig. 2, in which member B has been turned in direction of arrow 1 to form an acute angle of ten degrees. (See this arrow in Figs. 1 and 2.) It will be seen that this angle is formed complete to its vertex, and lines can be drawn accordingly until they intersect, which would not be possible if part of one of the semicircular disks had not been removed in the manner and to the extent shown. This also permits to draw at once such an angle by using edges $a$ and $b'$ as guides along which to pass a pencil. With most protractors it is not possible to draw immediately a certain angle, they serving usually merely for the purpose of locating points, but require the use of an additional ruler to draw the angle-forming lines which connect these points. The formation of an obtuse angle is shown in Fig. 3, member B being turned in the direction of arrow 2, the angle being formed between edges $b$ and $a$. (See this arrow in Figs. 1 and 3.)

The scale showing the degrees may be provided partly on one and partly on the other member or entirely on either one. By preference I provide it entirely on member A, and to facilitate quick reading it is advantageous to arrange two concentric rows of numbered graduations D $d$, the figures in one arranged in reverse to the other and either one of which may be used as is found most convenient at the time.

It will be noted that either part of the continuous base-line $a$ of member A is used to form one leg of each angle, while for the other leg edge $b'$ is used in acute angles and edge $b$ for obtuse ones, both edges on member B. Either one of these edges may be used to form one of the legs of a right angle (see dotted lines in Figs. 2 and 3) or angles close to it, although edge $b$ is preferred, since it permits a longer line to be drawn. Whichever one of these edges $b$ or $b'$ is used at the time to form one of the legs of the angle, the other edge serves at the same time as the indicator for it, registering on the scale the degrees of the particular angle. Thus, as shown in Fig. 2, edge $b'$ forms one of the legs of the angle, while edge $b$ serves as the indicator for reading the degrees on the outer row D of the graduations. In Fig. 3 this arrangement as to the edges is reversed and the inner row $d$ is used on which to read the degrees. Since these edges $b$ and $b'$ are not radii, but lines parallel to a radius and tangent to the circumference of hub $c$, it follows that the graduating-lines of the scale are run accordingly—that is, tangent to hub $c$.

For measuring existing angles this instrument provides, of course, fully for all exigencies.

As arranged it will be seen that when closed up, as shown in Fig. 1, one part of the implement covers the other, thereby protecting the graduations and numbers thereon.

Member B need not necessarily be a complete semicircle.

Having described my invention, I claim as new—

1. In an instrument for the purpose described, the combination of two members pivotally connected to each other, a straight, continuous, angle edge formed on one member, graduations showing degrees of angles provided around the curved edge of this member, a hub formed at the pivotal connecting center of the other member, a pivot connecting the center of this hub with the other member between the ends thereof, and parallel, angle-forming edges tangent to points diametrically apart on the hub mentioned from which they project in opposite directions, either being adapted to form an angle with a part of the continuous, angle-forming edge of the other member, the other of these parallel edges serving meanwhile in conjunction with the graduations mentioned to show the degrees of the angle so formed.

2. In an instrument for the purpose described, the combination of two members pivotally connected to each other, a straight, continuous, angle edge formed on one member, a hub formed at the pivotal connecting center of the other member, a pivot connecting the center of this hub with the other member and between the ends thereof, parallel, angle-forming edges, tangent to points diametrically apart on the hub mentioned from which they project in opposite directions, either being adapted to form an angle with a part of the continuous angle-forming edge of the other member, the other of these parallel edges serving meanwhile to show the size of the angle so formed and a degree-scale provided for such purpose with its graduation-lines alined to such edge and tangentially disposed to the circumference of the hub.

3. In an instrument for the purpose described, the combination of two members pivotally connected to each other, a straight, continuous, angle edge formed on one member, graduations showing degrees of angles provided around the curved edge of this member, parallel, angle-forming edges provided on the other member and extending in opposite direction from points equidistantly apart from its central connection and either of which is adapted to form an angle with a part of the continuous, angle-forming edge of the other member, the other of these parallel edges serving meanwhile in conjunction with the graduations mentioned to show the degrees of the angle formed.

In witness whereof I hereunto set my signature in the presence of two witnesses.

EARLY C. TRISLER.

Witnesses:
C. SPENGEL,
ARTHUR KLINE.